(12) United States Patent
Takemoto

(10) Patent No.: US 7,844,188 B2
(45) Date of Patent: Nov. 30, 2010

(54) LIGHT COLLECTING DEVICE AND SINGLE-PHOTON GENERATION DEVICE

(75) Inventor: Kazuya Takemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 11/857,765

(22) Filed: Sep. 19, 2007

(65) Prior Publication Data

US 2009/0022491 A1    Jan. 22, 2009

(30) Foreign Application Priority Data

Oct. 4, 2006    (JP) .............................. 2006-273371

(51) Int. Cl.
*H04B 10/04* (2006.01)
*H04B 10/12* (2006.01)
(52) U.S. Cl. ....................... 398/201; 398/182; 398/192; 398/200; 380/256
(58) Field of Classification Search ................. 398/182, 398/192, 200, 201; 380/256
See application file for complete search history.

(56) References Cited

U.S. PATENT DOCUMENTS

| 6,075,592 | A * | 6/2000 | Banerjee et al. ............. 356/318 |
| 2006/0210083 | A1* | 9/2006 | Takemoto et al. ........... 380/278 |

FOREIGN PATENT DOCUMENTS

| JP | 2000-292821 A | 10/2000 |
| JP | 2006-186084 A | 7/2006 |

OTHER PUBLICATIONS

Moehl et al., "Solid Immersion Lens-Enhanced Nano-Photoluminescence Principle and Applications", Journal of Applied Physics, 2003, vol. 93, pp. 6265-6272.*

* cited by examiner

*Primary Examiner*—Ken N Vanderpuye
*Assistant Examiner*—Daniel G Dobson
(74) *Attorney, Agent, or Firm*—Westerman, Hattori, Daniels & Adrian, LLP

(57) ABSTRACT

A light collecting device is disclosed that is able to couple light from a light emission structure to an optical fiber at low loss. The light collecting device includes an excitation light source for emitting excitation light to an optical fiber; a light condensing optical system which condenses the excitation light from the optical fiber to a light emission structure, and directs light reflected in the light emission structure and light generated in the light emission structure back to the optical fiber; a reflecting light detector for detecting intensity of the reflected light; a first optical divider for dividing the emission light and the reflected light based on their wavelengths, directing the emission light to the optical fiber, and propagating the reflected light to the excitation light source; a second optical divider arranged close to the excitation light source for propagating the excitation light to the first optical divider, and propagating the reflected light to the reflecting light detector; a position controller for controlling a light condensing position of the excitation light to be irradiated to the light emission structure; a unit for scanning the light condensing position of the excitation light, and acquiring a relationship of intensity of the reflected light and the light condensing position of the excitation light; and a unit for optimizing the light condensing position based on the intensity of the reflected light and the light condensing position of the excitation light.

20 Claims, 9 Drawing Sheets

LIGHT COLLECTING DEVICE AND SINGLE-PHOTON GENERATION DEVICE

CROSS-REFERENCE TO RELATED APPLICATION

This patent application is based on Japanese Priority Patent Application No. 2006-273371 filed on Oct. 4, 2006, the entire contents of which are hereby incorporated by reference.

BACKGROUND OF THE INVENTION

1. Field of the Invention

The present invention relates to a light collecting device which irradiates excitation light to a fine light emitter through an optical fiber and collects light emission from the fine light emitter, and a single-photon generation device.

2. Description of the Related Art

In order to realize electronic government (e-government), or electronic business (e-business), and furthermore, the next generation of an information society, safe and reliable cipher communication is indispensable. In cipher communication, a public encryption key and a secret encryption key are adopted.

When the public encryption key is used, since a great amount of time is required for deciphering, some security is achieved just because deciphering is so time-consuming. Such security is not sufficient. Whereas, when the secret encryption key is used, since the secret key itself may have been tapped during key distribution, the security is not sufficient, either.

In order to solve this security problem, it is proposed to use single-photons to carry key information providing unconditional security in quantum cipher communications, for example, those in conformity with the B884 protocol proposed by C. H. Bennett and G. Brassard in 1984. In addition, a semiconductor quantum dot, which is able to generate single-photons one by one by optical pulse excitation, is expected to be a promising candidate of the device for generating single-photons. In recent years, in order to increase the efficiency of producing single-photons, it has been attempted to place a single quantum dot inside a fine structure, such as a microcavity, or a small mesa structure. For example, Japanese Laid Open Patent Application No. 2000-292821 discloses a technique in this field by using the microcavity, and Japanese Laid Open Patent Application No. 2006-186084 discloses a technique in this field by using the small mesa structure.

In order to improve the throughput of the quantum cipher communications, it is important to couple an optical fiber for long distance transmission with the fine structure, which is a single-photon generator, at low loss.

FIG. 1 is a block diagram illustrating a light collecting device for a fine light emitter in the related art.

As shown in FIG. 1, in the related art, a micro-photoluminescence detection device 100 is used to optically excite the above-mentioned fine structure, couple the thus obtained light to an optical fiber 113, and collect the light. In the micro-photoluminescence detection device 100, a fine structure 101 for generating single-photons is fixed on a stage 102, which is movable in three dimensions; light from a light source 103 is irradiated on the fine structure 101 via beam splitters 104a and 104b, and the fine structure 101 is observed by using a CCD camera 105 and a monitor 106. The light source 103, the beam splitters 104a and 104b, the CCD camera 105, and the monitor 106 constitute an observing optical system.

The excitation light, which is used to generate the single-photons in the fine structure 101, is provided from an excitation laser 108, passes through a light path 109, which is different from the light path formed by the observing optical system, and a dielectric mirror 110, and is directed to the fine structure 101 by an object lens 111. The excitation laser 108, the light path 109, the dielectric mirror 110, and the object lens 111 constitute an excitation laser optical system.

The light emission generated in the fine structure 101 by the excitation light is incident into the optical fiber 113 through a condensing lens 112, and propagates to a detector 114. The condensing lens 112, the optical fiber 113, and the detector 114 constitute a fiber condensing optical system.

The above micro-photoluminescence detection device 100 allows the observing optical system, the excitation laser optical system, and the fiber condensing optical system to be adjusted separately and thus can be constructed on an optical bench easily; due to this, this kind of micro-photoluminescence detection device is widely used.

For example, this technique is also described in "S. Moehl et al., Journal of Applied Physics, 2003, Vol. 93, pp. 6265 to 6272", and "Takemoto, Japanese Journal of Applied Physics, 2004, Vol. 43, pp. L993-L995".

In the related art, however, on the light path between the fine structure 101 and the end 113a of the optical fiber 113, since optical elements like the dielectric mirror 110 for introducing the excitation light, and the beam splitter 104b of the observing optical system are present, the length of the lens cylinder increases, coupling efficiency between the fine structure 101 and the optical fiber 113 degrades, and consequently, loss from the fine structure 101 to the detector 114 increases.

Further, since the degree of freedom of independently adjusting the observing optical system, the excitation laser optical system, and the fiber condensing optical system is too high, it is difficult to align the observing center of the CCD camera 105 and the center axis of the optical fiber 113 with high precision, and it is difficult to obtain high positioning precision required for collecting light emissions from the fine structure 101 to the optical fiber 113.

SUMMARY OF THE INVENTION

According to a first aspect of the present invention, there is provided a light collecting device, including:

an excitation light source that emits excitation light to one end of an optical fiber;

a light condensing optical system that condenses the excitation light emitted from an input-output part at another end of the optical fiber to a light emission structure, and directs light reflected in the light emission structure and emission light generated by the excitation light in the light emission structure into the input-output part, a wavelength of said emission light being different from a wavelength of the excitation light;

a reflecting light detector that detects intensity of the reflected light;

a first optical divider that divides the emission light and the reflected light propagating in the optical fiber based on a light wavelength, directs the emission light to the input-output part, and propagates the reflected light to the excitation light source;

a second optical divider that is arranged at a position of the optical fiber closer to the excitation light source than to the first optical divider, propagates the excitation light to the first optical divider, and propagates the reflected light to the reflecting light detector;

a position controller that controls a light condensing position of the excitation light to be irradiated to the light emission structure;

a shape information acquisition unit that scans the light condensing position of the excitation light, and acquires a relationship between the intensity of the reflected light and the light condensing position of the excitation light; and a light condensing position optimizing unit that optimizes the light condensing position based on the intensity of the reflected light and the light condensing position of the excitation light.

According to a second aspect of the present invention, there is provided a single-photon generation device, including:

a single-photon generation element;

an excitation light source that emits excitation light to one end of an optical fiber;

a light condensing optical system that condenses the excitation light emitted from an input-output part at another end of the optical fiber to the single-photon generation element, and directs light reflected in the single-photon generation element and a single-photon generated by the excitation light in the single-photon generation element into the input-output part, a wavelength of said single-photon being different from a wavelength of the excitation light;

a reflecting light detector that detects intensity of the reflected light;

a first optical divider that divides the single-photon and the reflected light propagating in the optical fiber based on a light wavelength, directs the single photon to the input-output part, and propagates the reflected light to the excitation light source;

a second optical divider that is arranged at a position of the optical fiber closer to the excitation light source than to the first optical divider, propagates the excitation light to the first optical divider, and propagates the reflected light to the reflecting light detector;

a position controller that controls a light condensing position of the excitation light to be irradiated to the single-photon generation element;

a shape information acquisition unit that scans the light condensing position of the excitation light, and acquires a relationship between the intensity of the reflected light and the light condensing position of the excitation light; and a light condensing position optimizing unit that optimizes the light condensing position based on the intensity of the reflected light and the light condensing position of the excitation light.

DESCRIPTION OF THE PREFERRED EMBODIMENTS

Below, preferred embodiments of the present invention are explained with reference to the accompanying drawings.

First Embodiment

Figure 2:
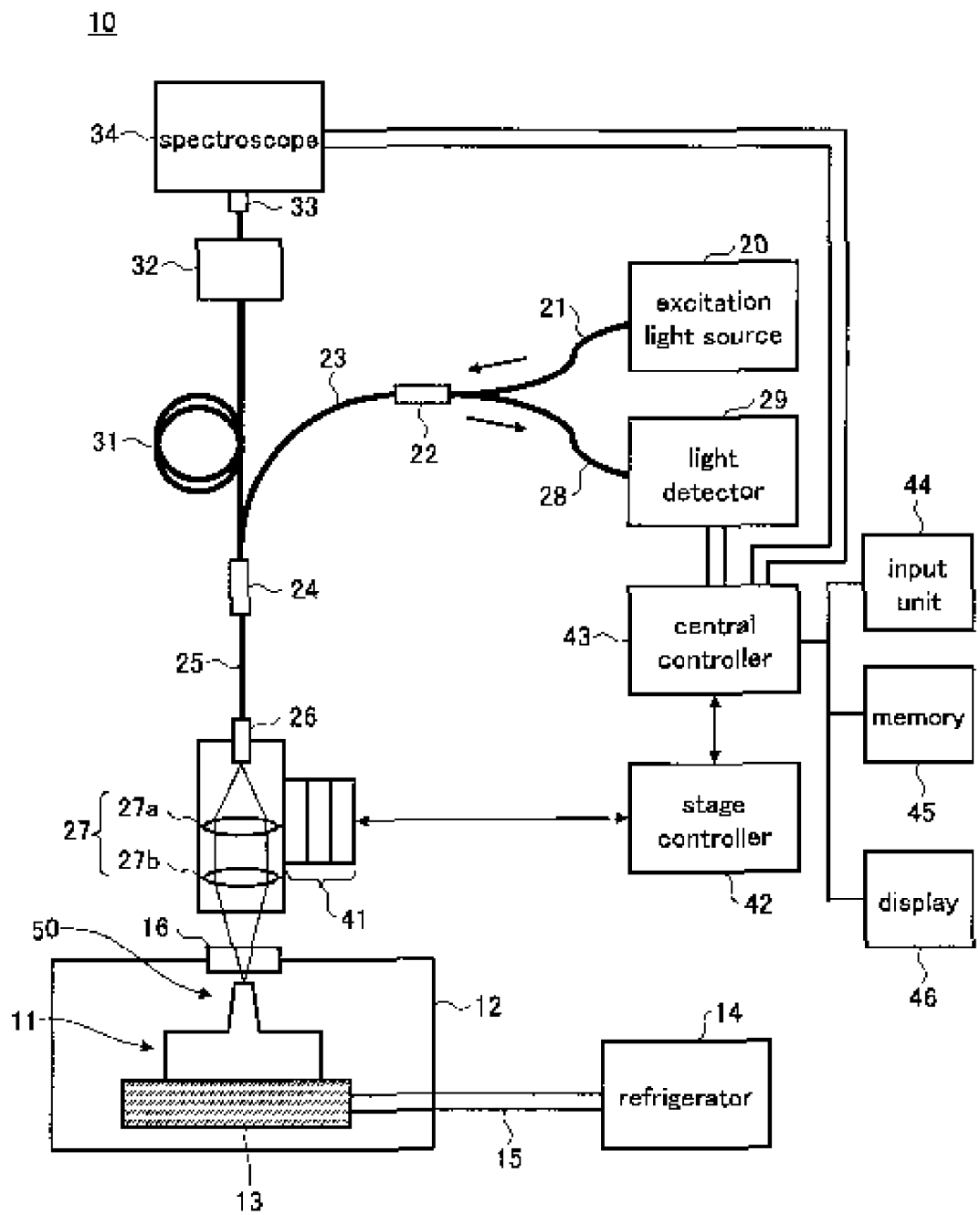
FIG. 2 is a block diagram illustrating a configuration of a light collecting device according to a first embodiment of the present invention.

FIG. 2 is a block diagram illustrating a configuration of a light collecting device according to a first embodiment of the present invention.

As shown in FIG. 2, a light collecting device 10 of the present embodiment includes a single-photon generation element 11, a cryostat 12, an excitation light source 20, optical fibers 21, 23, 25, 28, 31, a one×two coupler 22, a WDM (Wavelength Division Multiplexing) coupler 24, a light condensing optical system 27, an input-output part 26, a light detector 29, a stray light eliminator 32, a spectroscope 34, a three-axis stage 41, a stage controller 42, a central controller 43, an input unit 44r a memory 45, and a display 46.

The single-photon generation element 11 has a quantum dot structure 50 serving as a single-photon generating source.

The excitation light source 20 emits excitation light, which also serves as irradiation light to be irradiated on the single-photon generation element 11.

The light condensing optical system 27 collimates the excitation light propagating through the optical fibers 21, 23, 25 and going out of the optical fiber 25 at the input-output part 26, and condenses the light to the single-photon generation element 11; further, the light condensing optical system 27 collects and directs light reflected in the single-photon generation element 11 and single-photons generated by the excitation light in the single-photon generation element 11 to the input-output part 26.

The light detector 29 detects the intensity of the reflected light.

The WDM coupler 24 extracts the single-photons, which are generated by the excitation light in the single-photon generation element 11 and propagate through the light condensing optical system 27 and the optical fiber 25.

The three-axis stage 41, on which the light condensing optical system 27 is arranged, scans the excitation light to move a light condensing position of the excitation light.

The stage controller 42 drives the three-axis stage 41, and the central controller 43 drives the stage controller 42 and the light detector 29.

Further, in the light collecting device 10, by executing programs stored in the memory 45, the central controller 43 realizes functions of a shape information acquisition unit for acquiring shape information of the single-photon generation element 11 based on information of the intensity of the reflected light and position information of the three-axis stage 41, and a light condensing position optimizing unit for optimizing the light condensing position based on the shape information.

In the light collecting device 10 of the present embodiment, the excitation light also serves as the irradiation light, thus it is possible to easily condense light to the quantum dot structure 50, which serves as a single-photon generating source of the single-photon generation element 11, and to reduce the number of optical element parts between the input-output part 26 of the optical fiber 25 and the single-photon generation element 11, and reduce loss in the light collecting device 10.

Below, the constituent components of the light collecting device 10 are described in detail.

For example, the excitation light source 20 is a laser, and there is no limitation to the type of the laser, provided that it can emit a laser beam (excitation light) having a wavelength enabling excitation of the single-photon generation element 11. For example, a laser diode having a wavelength of 1.3 μm is used. It should be noted that in the present embodiment, the excitation laser beam also serves as irradiation light used for observing and measuring the shape of the single-photon generation element 11. Due to this, it is not necessary to provide a light source and a light path exclusively used for the irradiation light, or a coupler for extracting reflected irradiation light, and it is possible to reduce optical loss.

For example, the optical fibers 21, 23, 25, 28, 31 are single-mode optical fibers.

The one×two coupler 22 includes a forward port connected to the excitation light source 20 via the optical fiber 21, a return port connected to the light detector 29 via the optical fiber 28, and a common port connected to the WDM coupler 24 via the optical fiber 23.

It should be noted that the one×two coupler 22 can be replaced by other elements as long as the same functions can be achieved. For example, a two×two coupler, or an optical circulator may be used instead of the one×two coupler 22.

The WDM coupler 24 transmits the excitation light having a wavelength of 1.3 μm to the light condensing optical system 27, and, as described below, the WDM coupler 24 branches the reflecting light of the excitation light to the one×two coupler 22, and transmit single-photons, which are generated in the single-photon generation element 11 and have a wavelength of 1.5 μm, to the spectroscope 34.

It should be noted that the WDM coupler 24 can be replaced by other devices as long as the same functions can be achieved. For example, an AWG (Arrayed Waveguide Grating) type WWDM (Wideband Wavelength Division Multiplexing) may be used instead of the WDM coupler 24.

The light condensing optical system 27 includes a lens 27a for converting the excitation light outgoing from the input-output part 26 into a parallel light beam, and a lens 27b for condensing the parallel excitation light to the quantum dot structure 50 of the single-photon generation element 11. The lens 27a and the lens 27b are positioned so that the incident parallel excitation light is focused, while controlling the three-axis stage 41, on an end surface of the input-output part 26 and on the surface of the light emitting surface of the single-photon generation element 11.

It should be noted that the light condensing optical system 27 is not limited to the structure described above. For example, the light condensing optical system 27 may include a single lens or three or more lenses provided that the same function can be achieved.

The single-photon generation element 11 has a quantum dot structure 50 to generate single-photons, a wavelength of which is different from that of the excitation light, by exposure (irradiation) of the excitation light. There is no other limitation to the single-photon generation element 11 as long as a light emission portion, like the quantum dot structure 50, is present.

The quantum dot structure 50 may be any well-known quantum dot structure. Below, an example of the quantum dot structure 50 is explained.

Figure 3:
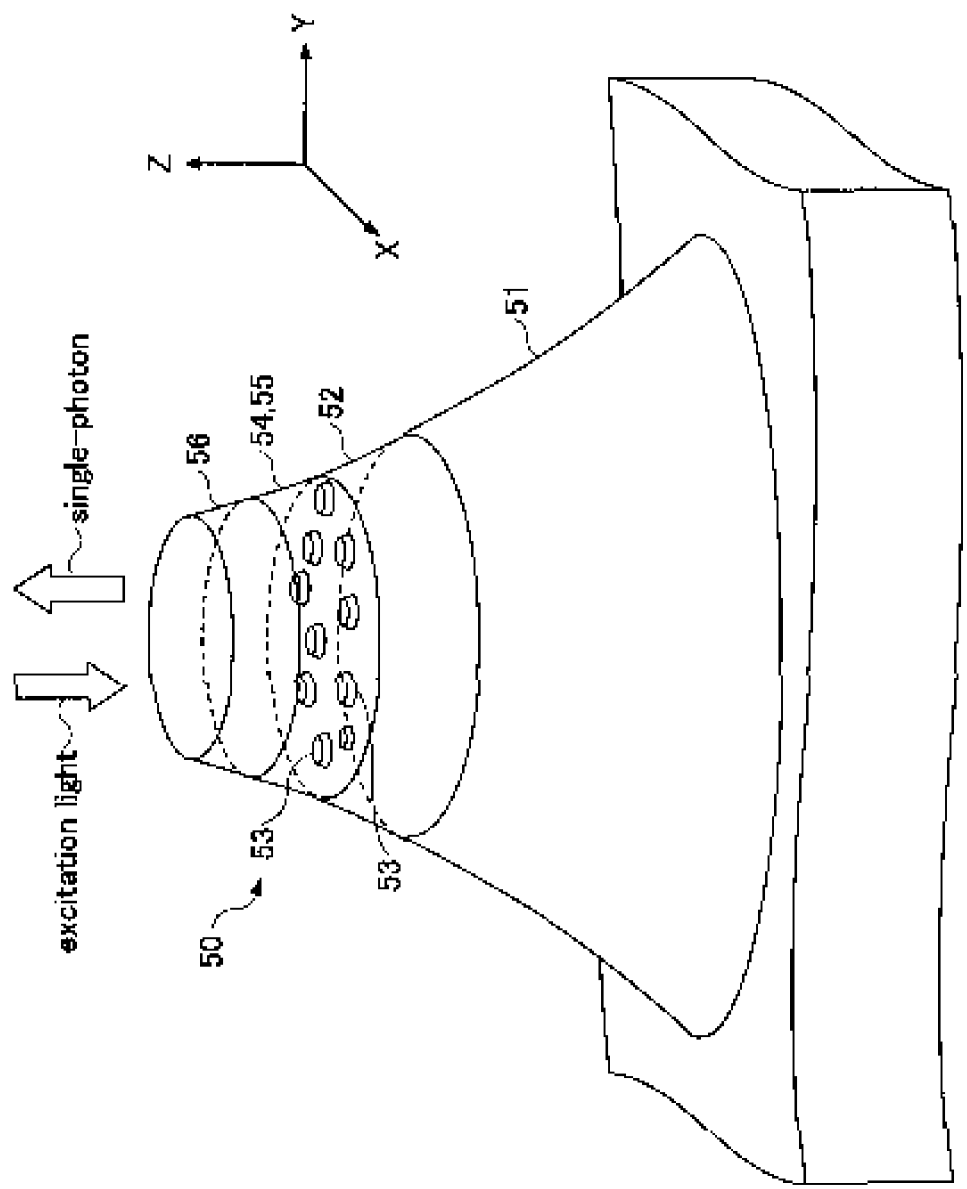
FIG. 3 is a schematic perspective view illustrating a structure of the quantum dot structure 50 according to the present embodiment.

FIG. 3 is a schematic perspective view illustrating a structure of the quantum dot structure 50 according to the present embodiment.

Figure 4:
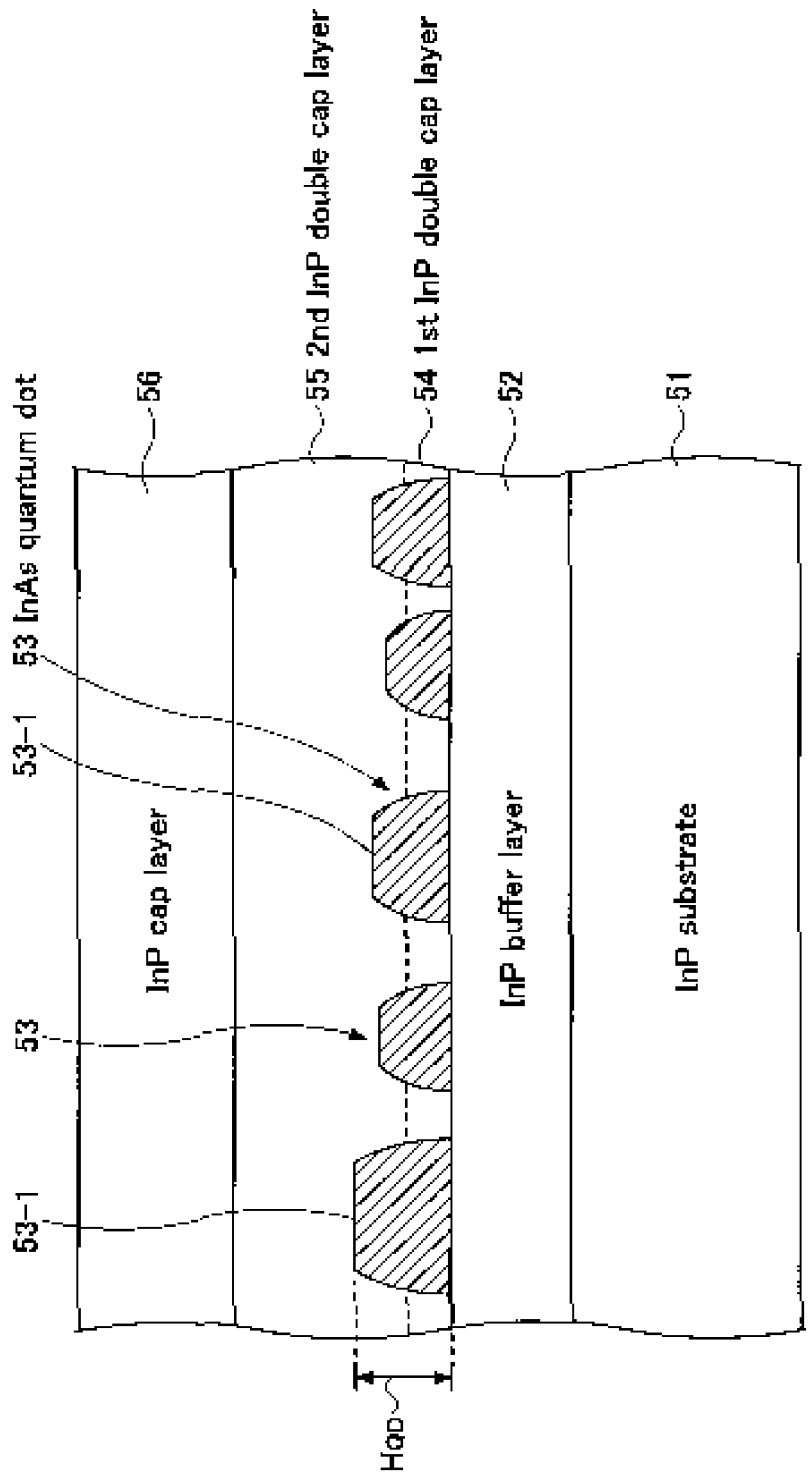
FIG. 4 is a schematic enlarged cross sectional view of the top portion of the quantum dot structure 50 as shown in FIG. 3.

FIG. 4 is a schematic enlarged cross-sectional view of the top portion of the quantum dot structure 50 as shown in FIG. 3.

In FIG. 3, a coordinate system is illustrated; the X axis and Y axis thereof are perpendicular to each other and are located in a plane parallel to the top surface of the quantum dot structure 50, and the Z axis is perpendicular to the top surface of the quantum dot structure 50.

As shown in FIG. 3 and FIG. 4, the quantum dot structure 50 has a mesa structure of a circular truncated cone shape. The top surface of the quantum dot structure 50 corresponds to an InP cap layer 56 illustrated in FIG. 4. It should be noted that the quantum dot structure 50 may be a plateau, which is lower than a circular truncated cone and has a broader top surface than that of the circular truncated cone.

As shown in FIG. 4, the quantum dot structure 50 has InAs/InP quantum dots. Specifically, the quantum dot structure 50 includes an InP buffer layer 52 (for example, 200 nm in thickness) formed on an InP substrate 51, plural InAs quantum dots 53 formed on the surface of the InP buffer layer 52, a first InP double cap layer 54 (for example, 2 nm in thickness) and a second InP double cap layer 55 (for example, 18 nm in thickness) covering the surface of the InP buffer layer 52 and the InAs quantum dots 53, and an InP cap layer 56 (for example, 100 nm in thickness) formed on the second InP double cap layer 55.

The InAs quantum dots 53 formed on the surface of the InP buffer layer 52 have different bottom surface diameters and heights $H_{QD}$. The InAs quantum dots 53 release single-photons upon sufficient irradiation of the excitation light from the side of the InP substrate 51 or the side of the InP cap layer 56. The single-photons are released in all directions. If the mesa structure of the quantum dot structure 50 is appropriately designed, it is possible to direct a major portion of the single-photons to the incidence side. The wavelength of the single-photons is determined by the bottom surface diameter and the height $H_{QD}$ of the InAs quantum dots 53. For example, the wavelength of the single-photon is long when the bottom surface diameter and the height $H_{QD}$ are large. Since the height $H_{QD}$ of the InAs quantum dots 53 takes discrete values depending on the number of InAs molecules, it is very easy to control the wavelength of the single-photons released from the InAs quantum dots 53.

Inventors of the present invention found previously that discrete and narrow-width line spectra were obtainable in the communication band-with (wavelength from 1.3 μm to 1.55 μm) from the InAs quantum dots 53 of the quantum dot structure 50 having the above structure, and further, single-photons having the wavelength of the line spectra were obtainable from the quantum dot structure 50 having the above structure. For example, reference can be made to "Jpn. J. Appl. Phys. Vol. 43, No. 3A, (2004), pp. L349-L351", and "Jpn. J. Appl. Phys. Vol. 43, No. 7B, (2004), pp. L993-L995".

In the quantum dot structure 50, plural InAs quantum dots 53 are formed on the surface of the InP buffer layer 52 having a mesa structure. With such a quantum dot structure 50, the excitation light is a pulsed laser beam having a wavelength of 780 nm, and upon irradiation of one pulse of the excitation light, single-photons having discrete wavelength in the range from 1.3 μm to 1.55 μm are generated.

For example, the quantum dot structure 50 can be fabricated by the method disclosed in Japanese Laid-open Patent Application No. 2006-229608.

It should be noted that instead of the quantum dot structure 50, any other well known quantum dot structure can be used. For example, a quantum dot structure may be used which involves a wavelength of the excitation light equaling 1.3 μm, and a wavelength of the light emitted from the quantum dot structure equaling 1.55 μm. In addition, the wavelength of the excitation light may be of any value provided that the photon energy of the excitation light is higher than the photon energy of the light emitted from the quantum dot structure, and the excitation light can be absorbed.

Returning to FIG. 2, the single-photon generation element 11 is located on a cooling block 13 in a cryostat 12. Liquid helium is supplied to the cooling block 13 from a refrigerator 14 through a refrigerant feeding pipe 15; thus the single-photon generation element 11 is cooled to a temperature of about 10 K. The excitation light is condensed onto the single-photon generation element 11 through an optical window 16 on the cryostat 12. The cryostat 12 is pumped to be under vacuum by a not-illustrated vacuum pump.

If the single-photon generation element 11 is able to work at room temperature, the cooling block 13, the refrigerator 14, and the refrigerant feeding pipe 15 can be omitted. Further, if it is not necessary for the cooling temperature to be as low as 10 K, liquid nitrogen may be used as the refrigerant instead of the liquid helium.

The three-axis stage 41, on which the light condensing optical system 27 is arranged, for example, is movable along an optical axis direction of the light condensing optical system 27 and in a plane perpendicular to the optical axis direction. When moving the three-axis stage 41 along the optical axis direction of the light condensing optical system 27, the incident parallel excitation light can be focused on the surface of the quantum dot structure 50 (as shown in FIG. 3) of the single-photon generation element 11.

When moving the three-axis stage 41 in a plane perpendicular to the optical axis direction of the light condensing optical system 27, for example, in the X direction and Y direction as shown in FIG. 3, the incident excitation light can be adjusted to scan the surface of the quantum dot structure 50.

The light detector 29 detects the intensity of the reflected light from the single-photon generation element 11. The light detector 29 may be an optical spectroscope, which detects the wavelength spectrum of the reflected light.

For example, the stray light eliminator 32 is a high-pass filter, a low-pass filter, or a band-pass filter, which blocks light of unnecessary wavelength and allows desired single-photons to pass through.

The spectroscope 34 detects the wavelength, count, and generation timing spectrum of the single-photons generated by the single-photon generation element 11. It should be noted that in the light collecting device 10, the spectroscope 34 can be omitted, and the single-photons can be extracted from an output part 33.

For example, the central controller 43 is a personal computer. The central controller 43 receives intensity data of the reflecting light given by the light detector 29, position information of the three-axis stage 41 given by the stage controller 42, and spectra of the single-photons given by the spectroscope 34.

An input unit 44, a memory 45, and a display 46 are connected to the central controller 43.

The memory 45 may be a semiconductor memory like a RAM or a ROM, a magnetic storage device like a hard disk device, a magnetic tape device, or an optical disk device. In the memory 45, there are stored programs executed by the central controller 43 and surface shape information of the quantum dot structure 50.

For example, the display 46 is a monitor for displaying a distribution of the reflected light from the quantum dot structure 50, or current intensity of the reflected light.

By executing programs stored in the memory 45, the central controller 43 realizes functions of the shape information acquisition unit for acquiring the shape information of the quantum dot structure 50 of the single-photon generation element 11 based on information of the intensity of the reflected light from the surface of the quantum dot structure 50 of the single-photon generation element 11, and on the position information of the three-axis stage 41, functions of the light condensing position optimizing unit for optimizing the light condensing position based on the shape information given by the shape information acquisition unit, and functions of a light condensing position drift compensation unit.

The shape information acquisition unit controls the three-axis stage 41 via the stage controller 42 to shift the light condensing position of the light condensing optical system 27 so as to scan the X-Y plane of the quantum dot structure 50 (as shown in FIG. 3). Thereby, the light detector 29 is allowed to detect the intensity of the reflected light and the wavelength distribution of the reflecting light. For sake of simplicity, below, it is simply described that "the light detector 29 detects the intensity of the reflected light".

In addition, the position information of the light condensing position can be obtained from the three-axis stage 41 or the stage controller 42. Position information of the light condensing position and intensity data of the reflected light corresponding to the light condensing position (referred to as "reflected light intensity distribution") are stored in the memory 45.

Figure 5:
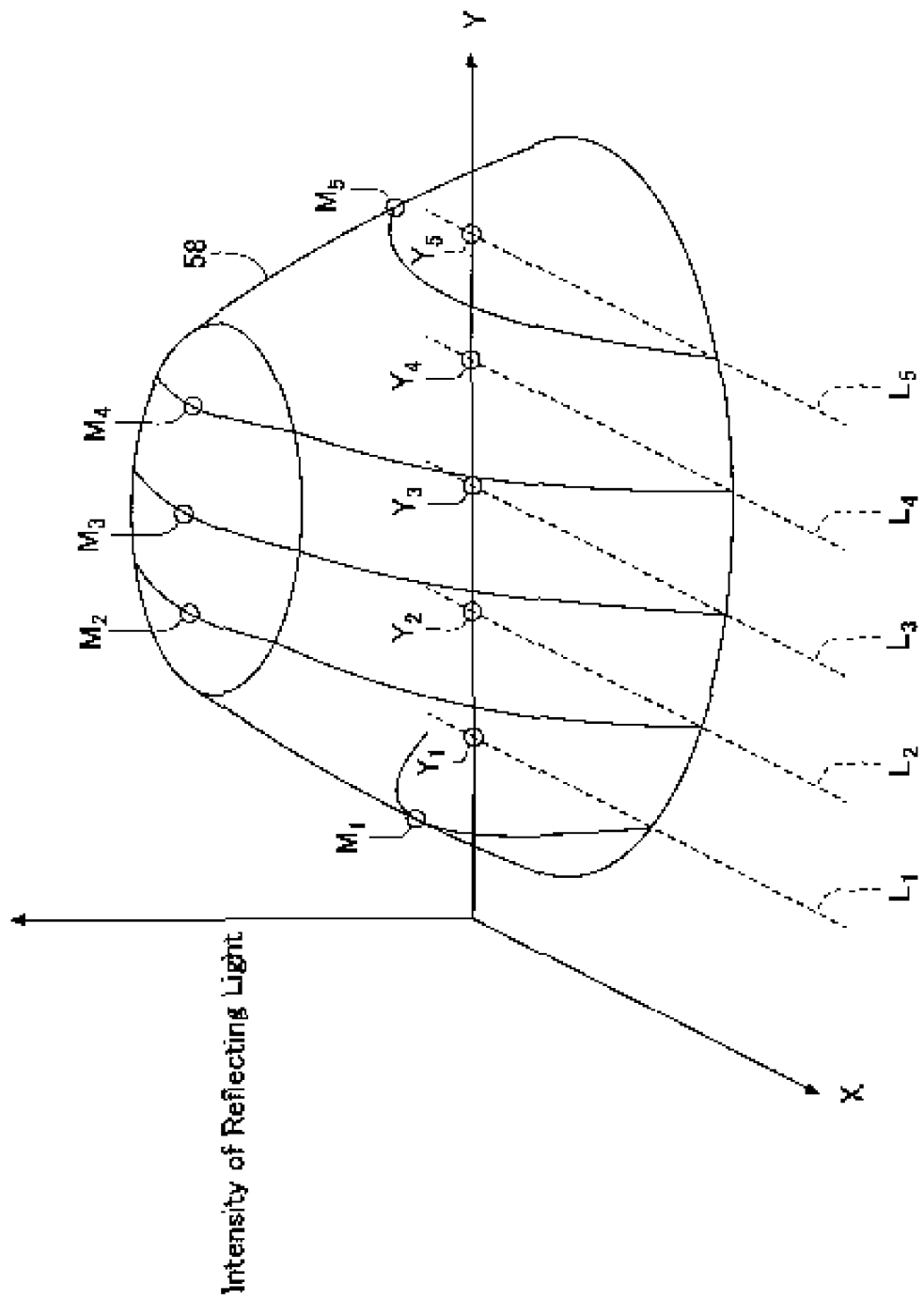
FIG. 5 schematically illustrates the intensity distribution of the reflecting light from the quantum dot structure 50 according to the present embodiment.

FIG. 5 schematically illustrates the intensity distribution of the reflected light from the quantum dot structure 50 according to the present embodiment.

In FIG. 5, the X axis and the Y axis respectively correspond to the X axis and the Y axis in FIG. 3, and the X and Y coordinates represent coordinates of the position information of the light condensing position; in addition, in FIG. 5, the vertical axis perpendicular to the X-Y plane represents the intensity distribution of the reflected light. It should be noted that in FIG. 5 the discrete measurement points are interpolated appropriately, and this results in continuous graphs.

Referring to FIG. 5, together with FIG. 2 and FIG. 3, the reflecting light intensity distribution 58 has a maximum at the center of the top surface of the quantum dot structure 50; on side surfaces of the quantum dot structure 50, the reflected light intensity decreases more and more at positions far from the top surface. Namely, the reflected light intensity distribution 58 has a shape similar to the shape of the quantum dot structure 50.

The light condensing position optimizing unit optimizes the light condensing position based on the shape information, namely, the reflected light intensity data, of the quantum dot structure 50 obtained by the shape information acquisition unit. For example, the light condensing position optimizing unit determines the light condensing position to be where the reflected light intensity is the maximum. Specifically, first, assume there exist five lines L1 through L5, which are parallel to the X axis and pass through five points of different Y coordinates Y1 through Y5, respectively, and the maximum reflected light intensity is calculated on each line of lines L1 through L5, obtaining five maximal reflected light intensities M1 through M5, then, the maximum of the five maximal reflected light intensities M1 through M5 is selected, for example, it is M3, and the X coordinate and the Y coordinate of M3 are determined to be the optimized light condensing position. Furthermore, the light condensing position optimizing unit controls the three-axis stage 41 via the stage controller 42 to set the condensing position of the excitation light to be the optimized light condensing position. Thereby, it is possible to align positions with the center of the quantum dot structure 50.

In this way, the shape information acquisition unit and the light condensing position optimizing unit enable the excitation light to be condensed at the optimized light condensing position. However, when the excitation light is continuously exposed on the single-photon generation element 11, the light condensing position may shift because of heat drift of the cooling block 13. Due to this, the amount of the reflected light may decreases, and when the condensing position shifts more, generation of the single-photons may stop. In order to avoid this problem, a unit may be provided to compensate for the light condensing position drift. When the light collecting device 10 is in operation, namely, when the excitation light is exposed on the single-photon generation element 11, the light condensing position drift compensation unit monitors the reflected light intensity, and when attenuation of the reflected light intensity, relative to the initial reflected light intensity at the optimized light condensing position, is greater than a certain threshold value, the light condensing position is optimized again. For example, the light condensing position is optimized again in the following way. When the attenuation of the reflected light intensity is greater than a first threshold value, the three-axis stage 41 is controlled to slightly move the light condensing position in the X direction and the Y direction to find the direction in which the reflected light intensity rises and the distance ought to be moved, then the light condensing position is set again based on this information. Further, when the attenuation of the reflected light intensity exceeds a second threshold value, which is greater than the first threshold value, the shape information acquisition unit and the light condensing position optimizing unit optimize the light condensing position again.

By executing programs stored in the memory 45, the central controller 43 further realizes functions of a light emission intensity distribution acquisition unit which acquires a light emission intensity distribution based on the position information of the three-axis stage 41 given by the stage controller 42 and the spectra of the single-photons given by the spectroscope 34 (namely, the wavelength dependence of the intensity of the single-photons). From the thus obtained light emission intensity distribution, it is possible to obtain the arrangement of quantum dots in the quantum dot structure 50.

Below, the operation of the light collecting device 10 is explained with reference to FIG. 2.

The single-photon generation element 11 is fixed on the cooling block 13 in the cryostat 12, which is pumped and in a vacuum state. Liquid helium is supplied to the cooling block 13 from the refrigerator 14 to cool the single-photon generation element 11 to a temperature of, for example, about 10 K.

The excitation light source 20 emits a pulsed excitation light beam, for example, of wavelength 1.3 µm, to the single-mode optical fiber 21. The excitation light passes through the forward port (not illustrated) of the one×two coupler 22 and propagates to the common port (not illustrated) of the one× two coupler 22, then passes through the optical fiber 23, the WDM coupler 24, and is emitted to the space of the light condensing optical system 27 from the input-output part 26.

The excitation light outgoing from the input-output part 26 is converted into a parallel light beam by the lens 27a of the light condensing optical system 27, and is condensed by the lens 27b onto the quantum dot structure 50 of the single-photon generation element 11.

The light reflected on the quantum dot structure 50 (thus having the same wavelength as the excitation light) propagates in a direction opposite to the excitation light, and passes through the common port (not illustrated) of the one×two coupler 22 and propagates to the return port (not illustrated) of the one×two coupler 22; then the reflected light is incident on the light detector 29 via the optical fiber 28.

Programs stored in the memory 45 are executed on the central controller 43 to realize functions of the shape information acquisition unit. Specifically, the three-axis stage 41 is controlled so that the light condensing optical system 27 moves the light-irradiation position of the excitation light on the X-Y plane (as shown in FIG. 3). Thus, data of the intensity of the reflected light is associated with the light condensing position information given by the three-axis stage 41, and these pieces of information are stored in the memory 45 as the shape information.

In addition, programs stored in the memory 45 are executed on the central controller 43 to realize functions of the light condensing position optimizing unit so as to optimize the light condensing position of the excitation light based on the shape information of the quantum dot structure 50, namely, the reflected light intensity distribution stored in the memory 45. The optimization of the light condensing position may be carried out as shown in FIG. 5; specifically, the light condensing position can be determined to be a position where the reflected light intensity is the maximum. Further, the three-axis stage 41 is set such that the excitation light is condensed at the optimized light condensing position.

In this way, in response to irradiation of the excitation light, single-photons having a wavelength of 1.55 µm are generated, and are incident into the optical fiber 25 through the input-output part 26 via the light condensing optical system 27. The WDM coupler 24 branches a portion of the single-photons toward the output part 33. The single-photons are extracted by the stray light eliminator 32 through the optical fiber 31, and are incident into the spectroscope 34 from the output part 33.

When the single-photons are being generated, programs stored in the memory 45 are executed on the central controller 43 to realize functions of the light condensing position drift compensation unit, specifically, the light detector 29 monitors the reflected light intensity, and when the attenuation of the reflected light intensity is greater than the first threshold value, the three-axis stage 41 is controlled to slightly move the condensing position of the excitation light in the X direction and the Y direction to find the direction in which the reflected light intensity rises and the distance the condensing position ought to be moved, then the light condensing position is set again based on this information. Further, when the attenuation of the reflected light intensity exceeds the second threshold value, which is greater than the first threshold value, the shape information acquisition unit and the light condensing position optimizing unit are driven to optimize the light condensing position again.

In addition, programs stored in the memory 45 are executed on the central controller 43 to further realize functions of the light emission intensity distribution acquisition unit so as to acquire the light emission intensity distribution based on the position information of the three-axis stage 41 given by the stage controller 42 and the spectra of the single-photons given by the spectroscope 34 (namely, the wavelength dependence of the intensity of the single-photons).

According to the light collecting device 10 of the present embodiment, since the light path of the excitation light is the same as the light path of the irradiation light, it is sufficient to provide only the light condensing optical system 27 between the input-output part 26 of the optical fiber 25 and the single-photon generation element 11 in order to condense the excitation light to the single-photon generation element 11. Therefore, it is possible to reduce optical loss to be a minimum between the input-output part 26 of the optical fiber 25 and the single-photon generation element 11, and output single-photons efficiently.

In addition, in the light collecting device 10 of the present embodiment, the excitation light also serves as the irradiation light to obtain the shape information of the quantum dot structure 50 of the single-photon generation element 11, and the light condensing position of the excitation light is optimized based on the shape information to generate and collect single-photons. For example, when the core diameter of the single-mode optical fiber 25 is 10 μm, the dimension of the quantum dot structure 50 is in a range from a few hundreds of nm to 1 μm, and the imaging magnification of the light condensing optical system 27 is 5, the size of the projection of the core of the single-mode optical fiber 25 on the single-photon generation element 11 is 2 μm. Since the light path of the excitation light is the same as the light path of the irradiation light in the light collecting device 10, it is possible to set the light condensing position with a precision equivalent to the position reproduction accuracy of the three-axis stage 41. Since the position reproduction accuracy of the three-axis stage 41 is about 10 nm, it is possible to obtain a positioning precision less than 1 μm. As a result, it is possible to reliably generate the single-photons.

Further, since the single-photons are collected while the intensity of the reflected light from the single-photon generation element 11 is being detected, even when the light condensing position shifts due to a temperature change of the cooling block 13 in the cryostat 12, the light condensing position drift compensation unit may be driven to adjust the position of the three-axis stage 41 to compensate for the light condensing position drift, and thus it is possible to stably generate and collect the single-photons for a long time.

Figure 6:
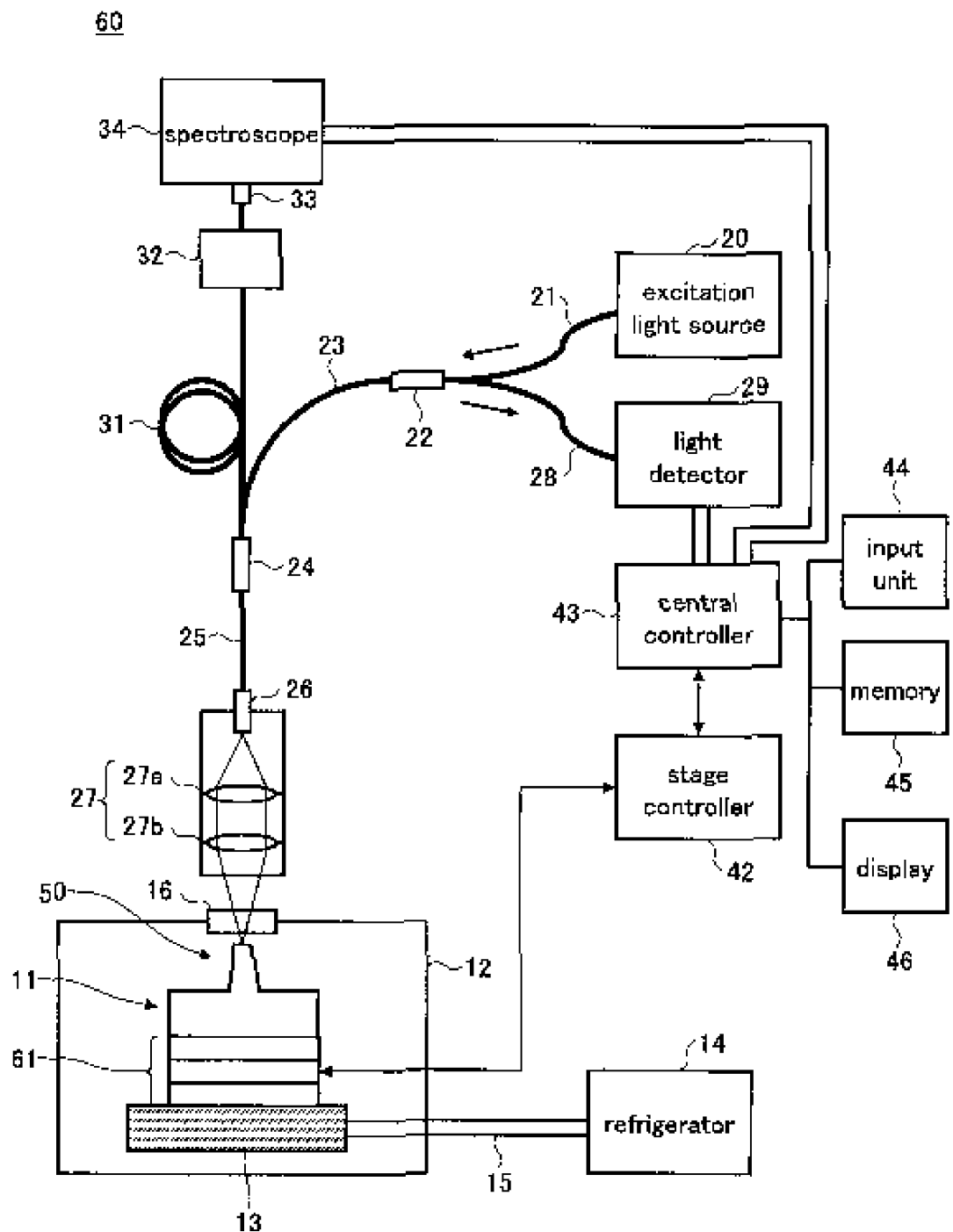
FIG. 6 is a block diagram illustrating a modification of the light collecting device according to the first embodiment of the present invention.

FIG. 6 is a block diagram illustrating a modification of the light collecting device according to the first embodiment of the present invention.

In FIG. 6, the same reference numbers are assigned to the same elements as those described previously, and overlapping descriptions are omitted.

Figure 1:
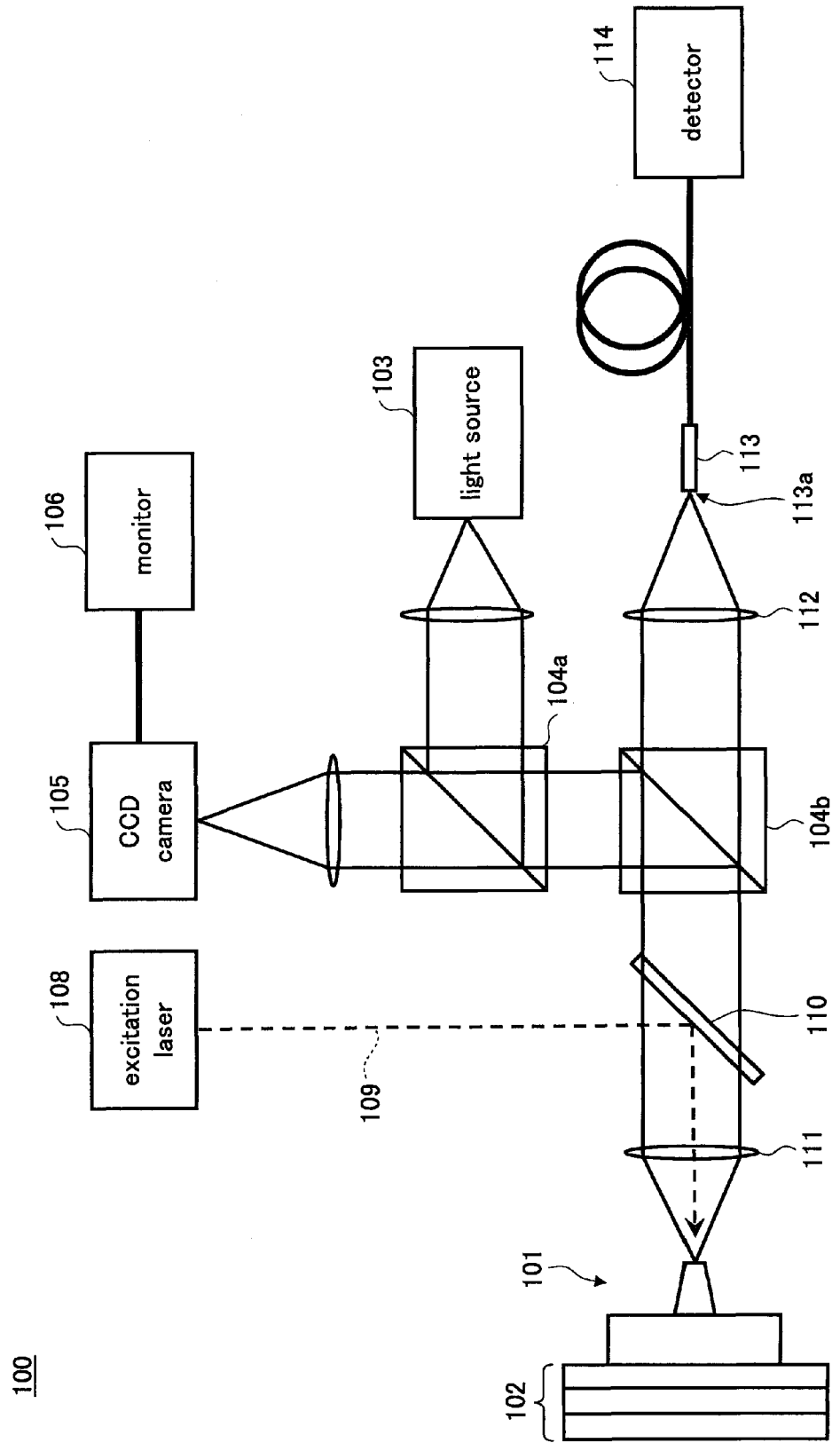
FIG. 1 is a block diagram illustrating a light collecting device for a fine light emitter in the related art.

A light collecting device 60 shown in FIG. 6 has the same configuration as the light collecting device 10 shown in FIG. 1 except that in the light collecting device 60, a three-axis stage 61 is provided in the cryostat 12 to move the single-photon generation element 11 so as to control the light condensing position of the excitation light.

As shown in FIG. 6, in the light collecting device 60, the three-axis stage 61 is fixed on the cooling block 13 in the cryostat 12, and the single-photon generation element 11 is fixed on the three-axis stage 61. The three-axis stage 61 is movable in the X axis, the Y axis, and the Z axis directions as shown in FIG. 3, and is controlled by the shape information acquisition unit, the light condensing position optimizing unit, and the light condensing position drift compensation unit, as in the light collecting device 10 shown in FIG. 2. Preferably, the three-axis stage 61 is operable even at an extremely low temperature, like 10 K, for example; the three-axis stage 61 may be a piezo-actuator.

In the light collecting device 60, since the single-photon generation element 11 is movable, it is not necessary to move the light condensing optical system 27; for this reason, it is easy to align the focal plane of the lens 27a to the end surface of the input-output part 26. In addition, since the single-photon generation element 11 can be made lighter than the light condensing optical system 27, it is easy for the three-axis stage 61 to drive the single-photon generation element 11 compared to the light collecting device 10 as shown in FIG. 2.

The light collecting device 60 can achieve the same effects as the light collecting device 10 shown in FIG. 2.

In the above, it is described that the single-photon generation element 11 is the object onto which the light collecting device 10 or the light collecting device 60 condenses the incident light. It should be noted that the present embodiment is not limited to this. The present embodiment is applicable to any light emission structure which has a fine structure and is capable of light emission induced by excitation light, and such a light emission structure can be used in the light collecting device 10 or the light collecting device 60, for example, cells having fluorescent substance, used as a marker pen. However, it is necessary that the wavelength of the excitation light be sufficiently different from the wavelength of the light emission so that the excitation light and the light emission can be separated by wavelength. This is true also in the following embodiments.

It is illustrated above in FIG. 3 that the excitation light is condensed onto the single-photon generation element 11 from the projecting side of the quantum dots, but the present embodiment is not limited to this; for example, the excitation light can also be condensed onto the single-photon generation element 11 from the side opposite to the projecting portion. In this case, the shape of the intensity distribution of the reflecting light is inverted to that shown in FIG. 5. For this reason, the light condensing position optimizing unit determines the light condensing position to be where the reflecting light intensity is the minimum.

It is described above that the quantum dot structure 50 has a mesa structure, but the present embodiment is not limited to this. For example, the quantum dot structure may have a pillar (columnar) structure.

Further, the light collecting device 10 shown in FIG. 2 and the light collecting device 60 shown in FIG. 6 can also be used as a single-photon generation device. For example, the single-photon generation device has a configuration the same as that shown in FIG. 2 and FIG. 6 except that the spectroscope 34 is absent. Such a single-photon generation device can achieve the same effects as the light collecting device 10 and the light collecting device 60.

In other words, in such a single-photon generation device, it is possible to reduce optical loss to be a minimum between the input-output part 26 of the optical fiber 25 and the single-photon generation element 11; since the excitation light also serves as the irradiation light to obtain the shape information of the quantum dot structure 50 of the single-photon generation element 11, and the light condensing position of the excitation light can be optimized based on the shape information, it is possible to reliably generate the single-photons.

Further, in such a single-photon generation device, since the single-photons are generated while the intensity of the reflected light from the single-photon generation element 11 is being detected, even when the light condensing position shifts due to a temperature change of the cooling block 13 in the cryostat 12, the light condensing position drift compensation unit may be driven to adjust the position of the three-axis stage 41 or 61 to compensate for the light condensing position drift, and thus it is possible to stably generate and collect the single-photons for a long time.

Second Embodiment

A second embodiment of the present invention relates to a light collecting device in which a single-photon generation element and a light condensing optical system are arranged in a cryostat.

Figure 7:
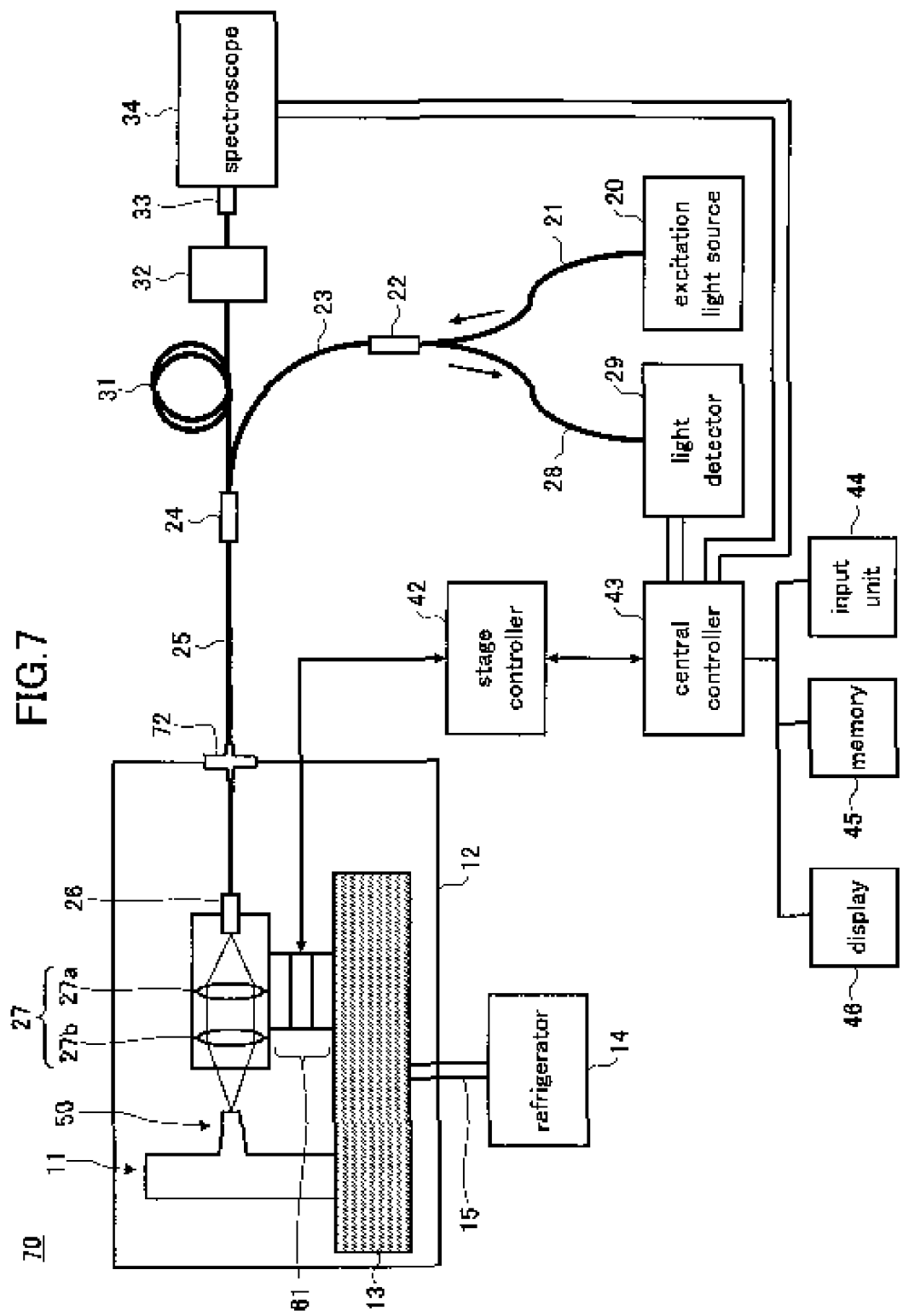
FIG. 7 is a block diagram illustrating a configuration of the light collecting device according to the second embodiment of the present invention.

FIG. 7 is a block diagram illustrating a configuration of the light collecting device according to the second embodiment of the present invention.

In FIG. 7, the same reference numbers are assigned to the same elements as those described previously, and overlapping descriptions are omitted.

As shown in FIG. 7, in a light collecting device 70, the single-photon generation element 11 and the three-axis stage 61 are provided on the cooling block 13 in the cryostat 12, and the light condensing optical system 27 is provided on the three-axis stage 61. An optical fiber 71 is introduced into the inside of the cryostat 12 through a vacuum coupler 72, and the input-output part 26 is arranged near the light condensing optical system 27. The three-axis stage 61 is movable in the X axis, the Y axis, and the Z axis directions as shown in FIG. 3, to move the light condensing position of the excitation light.

Similar to the light collecting device 10 of the first embodiment, in the light collecting device 70, by executing programs stored in the memory 45, the central controller 43 realizes functions of a shape information acquisition unit for acquiring the shape information of the quantum dot structure 50 of the single-photon generation element 11, functions of a light condensing position optimizing unit for optimizing the light condensing position based on the shape information, functions of a light condensing position drift compensation unit for compensating for light condensing position drift, and functions of a light emission intensity distribution acquisition unit for acquiring a light emission intensity distribution based on the position information of the three-axis stage 61 and the spectra of the single-photons given.

The operation of the light collecting device 70 is similar to the light collecting device 10, and detailed explanation is omitted.

According to the present embodiment, in the light collecting device 70, since the light condensing optical system 27 is arranged near the single-photon generation element 11, and the input-output part 26 is arranged near the light condensing optical system 27, the single-photon generation element 11 and the input-output part 26 can be coupled at low loss. This is desirable for collecting very weak light emission, like the single-photons. In addition, for the same reasons, the optical loss between the single-photon generation element 11 and the input-output part 26 is lower than that in the light collecting device 10 shown in FIG. 2.

As described above, when the excitation light is continuously exposed on the single-photon generation element 11, the light condensing position may shift because of heat drift of the cooling block 13. In the light collecting device 70, however, since a light condensing position drift compensation unit is provided, the light condensing position can be automatically re-set to be at the optimal position; hence, even though the light condensing optical system 27 is arranged inside the cryostat 12, it is possible to prevent shift of the light condensing position along with time, and in turn failure of collection of the single-photons can be avoided.

Figure 8:
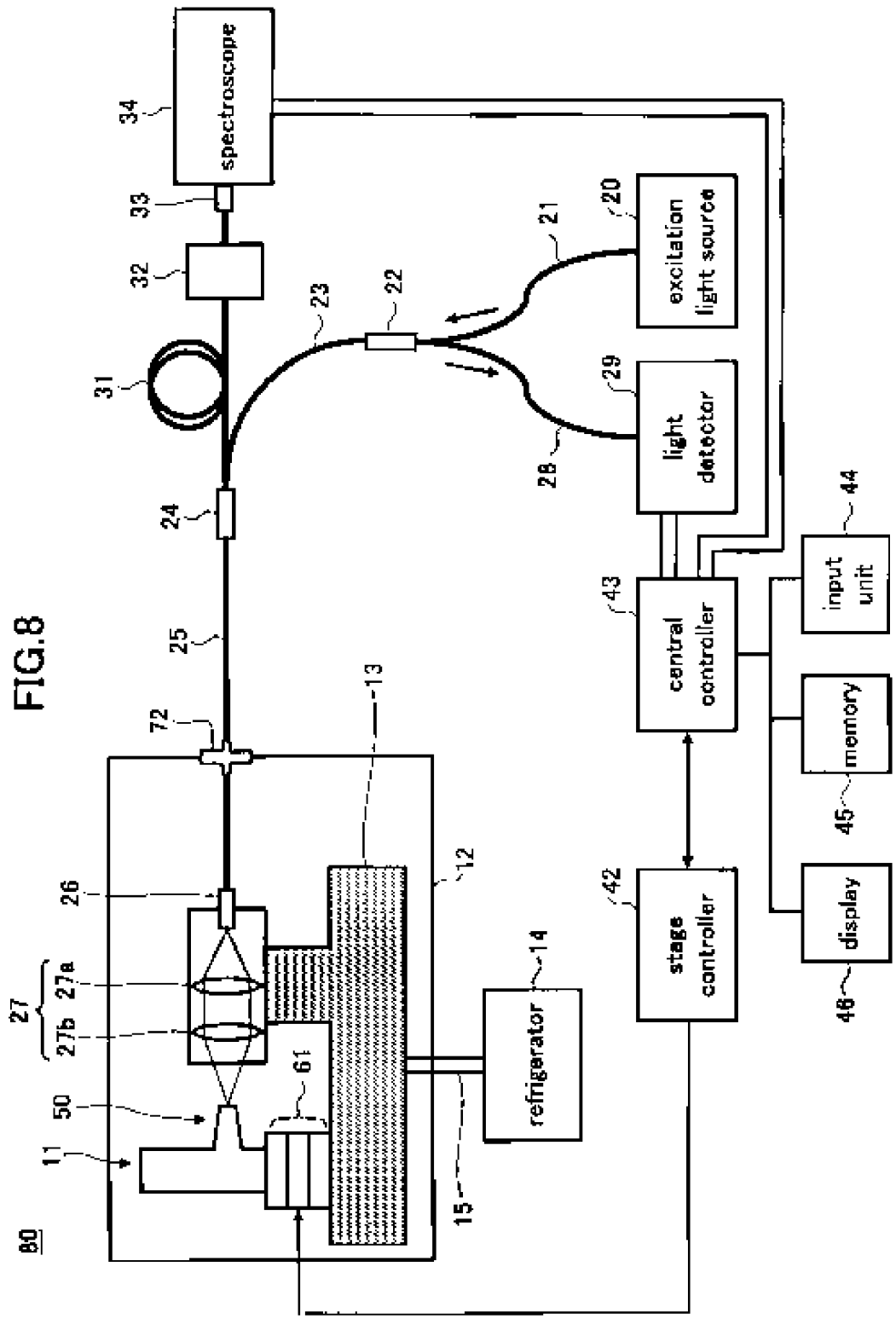
FIG. 8 is a block diagram illustrating a modification of the light collecting device according to the second embodiment of the present invention.

FIG. 8 is a block diagram illustrating a modification of the light collecting device according to the second embodiment of the present invention.

In FIG. 8, the same reference numbers are assigned to the same elements as those described previously, and overlapping descriptions are omitted.

A light collecting device 80 shown in FIG. 8 has the same configuration as the light collecting device 70 shown in FIG. 7 except that in the light collecting device 80, the single-photon generation element 11 is arranged on the three-axis stage 61 so that the single-photon generation element 11 is movable.

As shown in FIG. 8, in the light collecting device 80, the three-axis stage 61 is fixed on the cooling block 13 in the cryostat 12, and the single-photon generation element 11 is fixed on the three-axis stage 61. The three-axis stage 61 is movable in the X axis, the Y axis, and the Z axis directions as shown in FIG. 3, and is controlled by the shape information acquisition unit, the light condensing position optimizing unit, and the light condensing position drift compensation unit, as in the light collecting device 70 shown in FIG. 7.

In the light collecting device 80, since the single-photon generation element 11 is movable relative to the light condensing optical system 27, it is not necessary to move the light condensing optical system 27; for this reason, it is easy to align the focal plane of the lens 27a to the end surface of the input-output part 26. In addition, since the single-photon generation element 11 can be made lighter than the light condensing optical system 27, it is easy for the three-axis stage 61 to drive the single-photon generation element 11 compared to the light collecting device 10 as shown in FIG. 2.

The light collecting device 80 can achieve the same effects as the light collecting device 70 shown in FIG. 7.

Third Embodiment

A third embodiment of the present invention relates to a single-photon generation device to which the light collecting device 10 (or single-photon generation device) of the first embodiment is applied.

Figure 9:
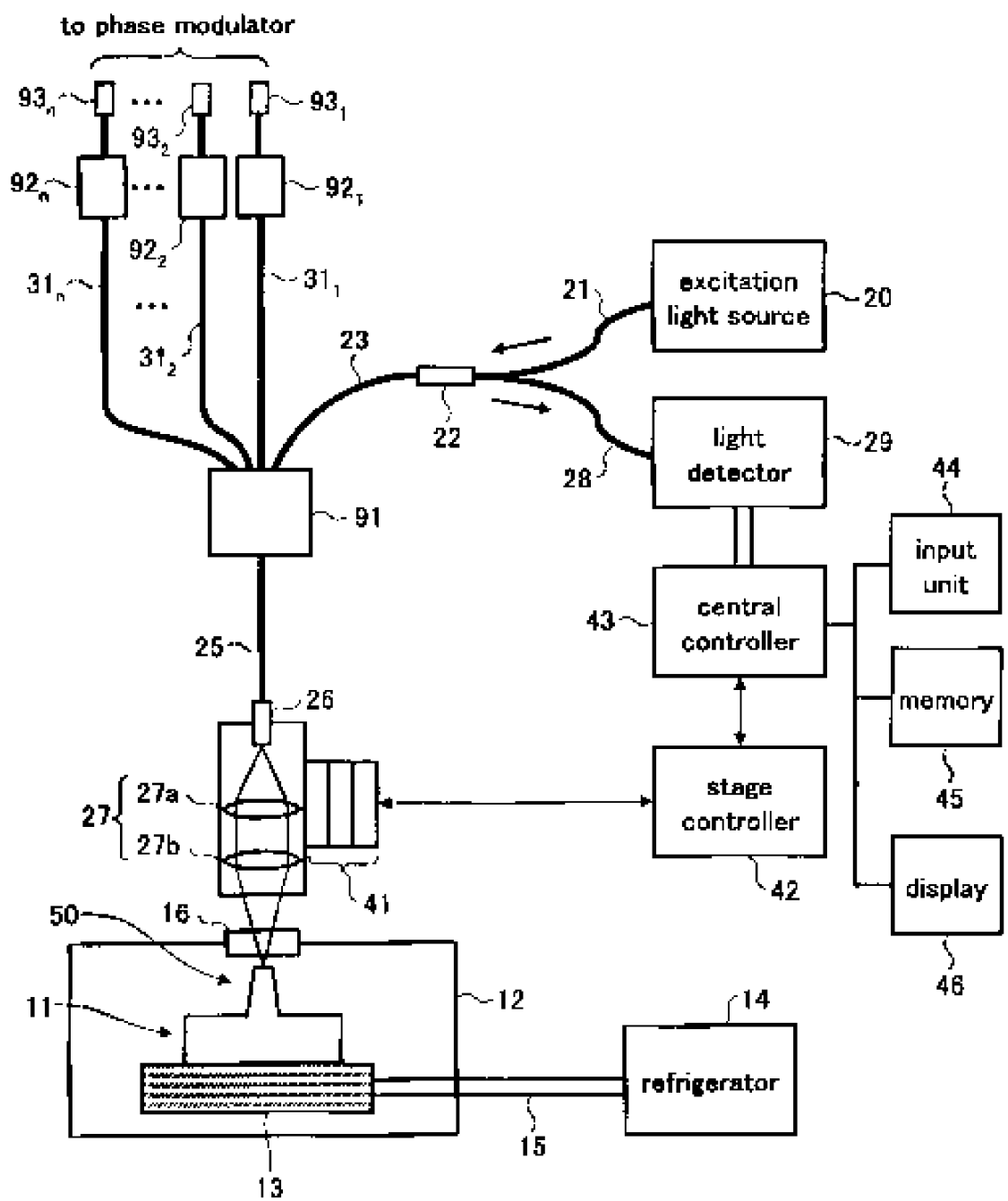
FIG. 9 is a block diagram illustrating a configuration of a single-photon generation device according to the third embodiment of the present invention.

FIG. 9 is a block diagram illustrating a configuration of a single-photon generation device according to the third embodiment of the present invention.

In FIG. 9, the same reference numbers are assigned to the same elements as those described previously, and overlapping descriptions are omitted.

As shown in FIG. 9, a single-photon generation device 90 of the present embodiment includes a single-photon generation element 11, a cryostat 12, an excitation light source 20, optical fibers 21, 23, 25, 28, a onextwo coupler 22, a light condensing optical system 27, an input-output part 26, a light detector 29, a three-axis stage 41, a stage controller 42, a central controller 43, an input unit 44, a memory 45, a display 46, a WDM (Wavelength Division Multiplexing) coupler 91, band-pass filters $92_1$ through $92_n$, and output parts $93_1$ through $93_n$.

The single-photon generation element 11 generates single-photons having different wavelengths from each other.

The excitation light source 20 emits excitation light, which also serves as irradiation light to be irradiated on the single-photon generation element 11.

The light condensing optical system 27 collimates the excitation light propagating through the optical fibers 21, 23, 25 and going out of the optical fiber 25 at the input-output part 26, and condenses the light to the single-photon generation element 11; further, the light condensing optical system 27 collects and directs light reflected in the single-photon generation element 11 and single-photons generated by the excitation light in the single-photon generation element 11 to the optical fiber 25.

The light detector 29 detects the intensity of the reflecting light propagating through the optical fibers 25, 23, 28.

The WDM coupler 91 extracts the single-photons of different wavelengths, which are generated by the excitation light in the single-photon generation element 11 and propagate through the light condensing optical system 27 and the optical fiber 25.

The band-pass filters $92_1$ through $92_n$ block light of unnecessary wavelength and pass through desired single-photons.

The output parts $93_1$ through $93_n$ output the single-photons to a phase modulator.

The three-axis stage 41, on which the light condensing optical system 27 is arranged, scans the excitation light to move a light condensing position of the excitation light.

The stage controller 42 drives the three-axis stage 41, and the central controller 43 drives the stage controller 42 and the light detector 29.

Further, in the single-photon generation device 90, by executing programs stored in the memory 45, the central controller 43 realizes functions of a shape information acquisition unit for acquiring shape information of the single-photon generation element 11, a light condensing position optimizing unit for optimizing the light condensing position based on the shape information, and a light condensing position drift compensation unit for compensating for light condensing position drift.

Since the single-photon generation device 90 has a configuration similar to that of the light collecting device 10 in FIG. 2, below, only components of the single-photon generation device 90 different from the light collecting device 10 in FIG. 2 are described.

The single-photon generation element 11 generates single-photons having different wavelengths from each other. In other words, the single-photon generation element 11 generates wavelength-multiplexed single-photons. For example, the single-photon generation element 11 has the quantum dot structure 50 formed the InAs quantum dots 53, which have different bottom surface diameters and heights $H_{QD}$, as shown in FIG. 3 and FIG. 4. The single-photon generation element 11 generates plural single-photons having different wavelengths from each other at the same time upon irradiation by one pulse of the excitation light.

The WDM coupler 91 branches the wavelength-multiplexed single-photons into single-photons of different wavelengths $\lambda_1$ through $\lambda_n$, and sends them to the output parts $93_1$ through $93_n$. It should be noted that the WDM coupler 91 can be replaced by other devices as long as the same functions can be achieved. For example, an AWG (Arrayed Waveguide Grating) type WWDM (Wideband Wavelength Division Multiplexing) can be used instead of the WDM coupler 91.

The band-pass filters $92_1$ through $92_n$ block light of a wavelength close to the desired wavelength, and pass through single-photons of the desired wavelength. The band-pass filters $92_1$ through $92_n$ block photons of the unnecessary wavelengths, which the WDM coupler 91 fails to block. For example, the width of the transmission wavelength of the band-pass filters $92_1$ through $92_n$ can be set to be about 1 nm. For example, a dielectric multilayer film or a diffracting grating can be used as the band-pass filters $92_1$ through $92_n$.

Further, for the band-pass filters $92_1$ through $92_n$, filters of variable transmission wavelength and width of the transmission wavelength can be used. In addition, if the WDM coupler 91 succeeds in blocking all photons of unnecessary wavelengths, the band-pass filters $92_1$ through $92_n$ can be omitted.

Single-photons of wavelengths $\lambda_1$ through $\lambda_n$ are respectively output from the output parts $93_1$ through $93_n$ to the phase modulator.

In the single-photon generation device 90, since the single-photon generation element 11 is able to generate single-photons having different wavelengths from each other, namely, the single-photon generation element 11 is able to generate wavelength-multiplexed single-photons, it is possible to generate and output single-photons having different wavelengths from each other at the same time. Further, the single-photon generation device 90 can achieve the same effects as the light collecting device 10 in FIG. 2 when the light collecting device 10 in FIG. 2 is used as a single-photon generation device. As a result, it is possible to reliably generate plural single-photons having different wavelengths from each other at the same time with a good long-term stability.

In the single-photon generation device 90, although not illustrated, a phase modulator is provided on the downstream side of the output parts $93_1$ through $93_n$ to assign secret key information to the phase state of individual single photon, and due to this, the single-photon generation device 90 can also be used as a transmitting device of a secret key distribution system.

Note that arrangement of the light condensing optical system 27 and the three-axis stage 41 in the single-photon generation device 90 can be replaced by those in the light collecting devices 60, 70, 80 shown in FIG. 7 through FIG. 8.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

What is claimed is:

1. A light collecting device, comprising:
an excitation light source that emits excitation light to one end of an optical fiber;
a light condensing optical system that condenses the excitation light emitted from an input-output part at another end of the optical fiber to a light emission structure, and directs reflected light reflected in the light emission structure and emission light generated by the excitation light in the light emission structure to the input-output part, a wavelength of said emission light being different from a wavelength of the excitation light;
a reflecting light detector that detects intensity of the reflected light;
a first optical divider that divides the emission light and the reflected light propagating in the optical fiber based on a light wavelength, directs the emission light to the input-output part, and propagates the reflected light to the excitation light source;
a second optical divider that is arranged at a position of the optical fiber closer to the excitation light source than to the first optical divider, propagates the excitation light to the first optical divider, and propagates the reflected light to the reflecting light detector;
a position controller that controls a light condensing position of the excitation light to be irradiated to the light emission structure;
a shape information acquisition unit that scans the light condensing position of the excitation light, and acquires a relationship between the intensity of the reflected light and the light condensing position of the excitation light; and
a light condensing position optimizing unit that optimizes the light condensing position based on the intensity of the reflected light and the light condensing position of the excitation light.

2. The light collecting device as claimed in claim 1, further comprising:

a light condensing position shift compensation unit that optimizes the light condensing position of the excitation light according to attenuation of the intensity of the reflected light detected by the reflecting light detector.

3. The light collecting device as claimed in claim 2, wherein the shape information acquisition unit and the light condensing position optimizing unit optimize the light condensing position again, when the attenuation of the intensity of the reflected light is greater than a predetermined threshold value relative to initial reflected light intensity obtained when the light condensing position is optimized by the light condensing position optimizing unit.

4. The light collecting device as claimed in claim 1, further comprising:
a light emission detector that is connected to the input-output part and detects intensity of the emission light; and
a light emission intensity distribution acquisition unit that acquires a light emission intensity distribution based on the intensity of the emission light and the light condensing position of the excitation light.

5. The light collecting device as claimed in claim 1, wherein
the light emission structure is a single-photon generation element having a convex mesa structure or a pillar structure with respect to an outgoing side of the excitation light, and
the light condensing position optimizing unit sets the optimum light condensing position to be associated with a maximum intensity of the reflected light.

6. The light collecting device as claimed in claim 1, wherein
the light emission structure is a single-photon generation element having a concave mesa structure or a pillar structure with respect to an outgoing side of the excitation light, and
the light condensing position optimizing unit sets the optimum light condensing position to be associated with a minimum intensity of the reflected light.

7. The light collecting device as claimed in claim 1, wherein
the position controller comprises a three-axis stage, and
the light condensing optical system is arranged on the three-axis stage.

8. The light collecting device as claimed in claim 1, wherein
the position controller comprises a three-axis stage, and
the light emission structure is arranged on the three-axis stage.

9. A single-photon generation device, comprising:
a single-photon generation element;
an excitation light source that emits excitation light to one end of an optical fiber;
a light condensing optical system that condenses the excitation light emitted from an input-output part at another end of the optical fiber to the single-photon generation element, and directs reflected light reflected in the single-photon generation element and a single-photon generated by the excitation light in the single-photon generation element to the input-output part, a wavelength of said single-photon being different from a wavelength of the excitation light;
a reflecting light detector that detects intensity of the reflected light;
a first optical divider that divides the single-photon and the reflected light propagating in the optical fiber based on a light wavelength, directs the single photon to the input-output part, and propagates the reflected light to the excitation light source;
a second optical divider that is arranged at a position of the optical fiber closer to the excitation light source than to the first optical divider, propagates the excitation light to the first optical divider, and propagates the reflected light to the reflecting light detector;
a position controller that controls a light condensing position of the excitation light to be irradiated to the single-photon generation element;
a shape information acquisition unit that scans the light condensing position of the excitation light, and acquires a relationship between the intensity of the reflected light and the light condensing position of the excitation light; and
a light condensing position optimizing unit that optimizes the light condensing position based on the intensity of the reflected light and the light condensing position of the excitation light.

10. The single-photon generation device as claimed in claim 9, further comprising:
a light condensing position shift compensation unit that optimizes the light condensing position of the excitation light according to attenuation of the intensity of the reflected light detected by the reflecting light detector.

11. The single-photon generation device as claimed in claim 10, wherein the shape information acquisition unit and the light condensing position optimizing unit optimize the light condensing position again, when the attenuation of the intensity of the reflected light is greater than a predetermined threshold value relative to initial reflected light intensity obtained when the light condensing position is optimized by the light condensing position optimizing unit.

12. The single-photon generation device as claimed in claim 9, wherein
the single-photon generation element has a convex mesa structure or a pillar structure with respect to an outgoing side of the excitation light, and
the light condensing position optimizing unit sets the optimum light condensing position to be associated with a maximum intensity of the reflected light.

13. The single-photon generation device as claimed in claim 9, wherein
the single-photon generation element has a concave mesa structure or a pillar structure with respect to an outgoing side of the excitation light, and
the light condensing position optimizing unit sets the optimum light condensing position to be associated with a minimum intensity of the reflected light.

14. The single-photon generation device as claimed in claim 9, wherein
the position controller comprises a three-axis stage, and
the light condensing optical system is arranged on the three-axis stage.

15. The single-photon generation device as claimed in claim 9, wherein
the position controller comprises a three-axis stage, and
the single-photon generation element is arranged on the three-axis stage.

16. The single-photon generation device as claimed in claim 9, further comprising:
a cryostat that accommodates the single-photon generation element;
wherein the light condensing optical system condenses the excitation light to the single-photon generation element through an optical window of the cryostat.

17. The single-photon generation device as claimed in claim 9, further comprising:
   a cryostat that accommodates the single-photon generation element;
   wherein
   the input-output part connected to the optical fiber led into the cryostat and the light condensing optical system are arranged in the cryostat.

18. The single-photon generation device as claimed in claim 9, wherein the single-photon generation element has a quantum dot structure.

19. The single-photon generation device as claimed in claim 18, wherein
   the quantum dot structure includes a plurality of quantum dots on a surface of a semiconductor layer, and sizes of the quantum dots are different from each other,
   wherein
   plural of the single-photons having different wavelengths from each other are generated at the same time by one pulse of the excitation light.

20. The single-photon generation device as claimed in claim 19, wherein the first optical divider branches the single-photons in terms of a wavelength thereof.

* * * * *